June 5, 1951 J. M. CROWE Re. 23,372

FLUID BURNER WITH AUXILIARY EXTERNAL OXYGEN SUPPLY

Original Filed Aug. 5, 1947 2 Sheets-Sheet 1

INVENTOR.
JOHN MARSHALL CROWE
BY Joseph T. Zugelter
Atty.

June 5, 1951 J. M. CROWE Re. 23,372

FLUID BURNER WITH AUXILIARY EXTERNAL OXYGEN SUPPLY

Original Filed Aug. 5, 1947 2 Sheets-Sheet 2

INVENTOR.
JOHN MARSHALL CROWE
BY Joseph L. Zugelter
Atty.

Reissued June 5, 1951

Re. 23,372

UNITED STATES PATENT OFFICE 23,372

FLUID BURNER WITH AUXILIARY EXTERNAL OXYGEN SUPPLY

John Marshall Crowe, Covington, Ky.

Original No. 2,484,272, dated October 11, 1949, Serial No. 766,279, August 5, 1947. Application for reissue August 30, 1950, Serial No. 182,224

5 Claims. (Cl. 158—11)

Matter enclosed in heavy brackets [ ] appears in the original patent but forms no part of this reissue specification; matter printed in italics indicates the additions made by reissue.

The present invention relates to a burner of the type adapted for use in the operation of open hearth furnaces for the manufacture of steel, or for the melting of iron and other products requiring application of high temperatures.

An object of the invention is to provide a highly effective burner of the class referred to, using oxygen as a fuel supplement.

Another object is to produce a burner utilizing oxygen under high pressure, to gain a maximum heating efficiency of the burner, with conservation of fuel as one of the advantages.

A further object is to provide a burner of the character described, which is structurally improved to gain maximum durability, efficiency, and economy in the operation thereof; so that in the manufacture of commodities such as steel in various forms, use of the improved burner reduces the smelting time by several hours with a resultant reduction of cost in labor, fuel, and furnace maintenance.

Another object is to provide new and improved structural features in a burner of the class described, which reduce the cost of materials and labor in assembly, so that the burner may be substituted for other and less efficient equipment without prohibitive expense.

The foregoing and other objects are attained by the means disclosed herein and illustrated upon the accompanying drawings in which.

Burners of the general character herein disclosed, have been referred to in the steel industry as artillery type burners. In the use of such burners, the fuels commonly employed were oil, pitch, combustible gas such as illuminating gas or natural gas, with steam or air under pressure employed to produce a blast at the nose of the burner. When used in connection with open hearth furnaces, the burners are required to so project a flame, that combustion will occur chiefly within the hearth and upon the melt. Accordingly, it is desirable that the hottest portion of the flame be made to occur at a substantial distance from the burner nose. Burners which operate in any manner contrary to that which is described, are objectionable for the reason that they induce premature deterioration of the furnace lining.

Up to the present time, there has been considerable opportunity offered for the improvement of artillery type burners. The majority of burners presently in use have been found wanting in efficiency and economy of operation, and one of the objectives of the present invention is to obviate those objections. The improved burner of this invention has proven in practice, to greatly reduce the smelting period, with a very considerable saving in fuel and labor. It is therefore to be expected that the cost of producing steel in its various forms, will be greatly reduced with the installation of this burner.

Figure 2:
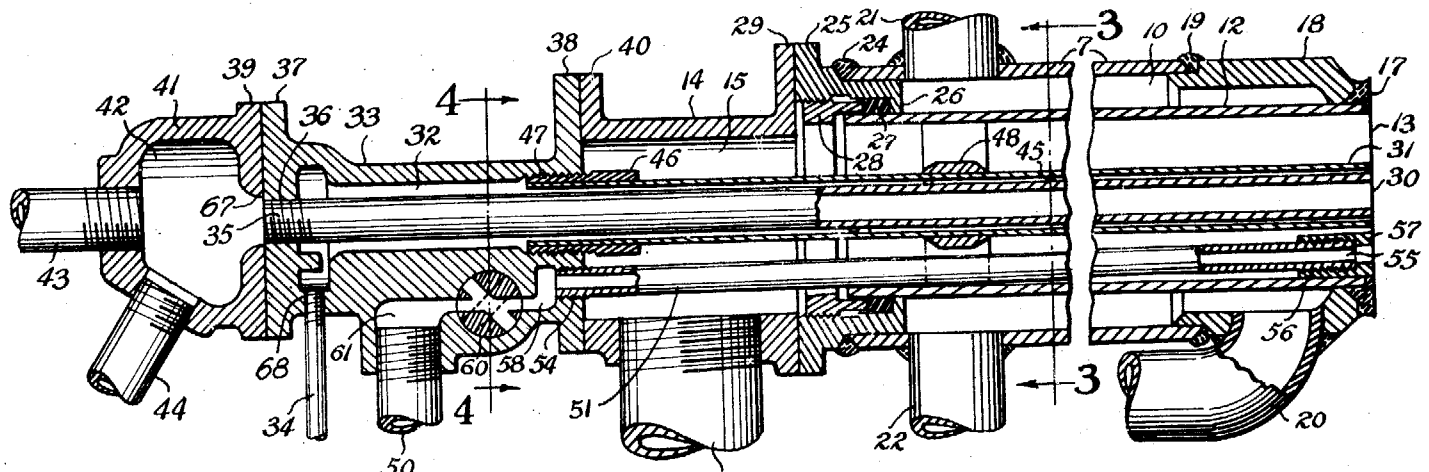
Fig. 2 is an enlarged vertical cross-sectional view of the burner illustrated by Fig. 1, a section thereof being removed to conserve space upon the drawing.
Figure 1:
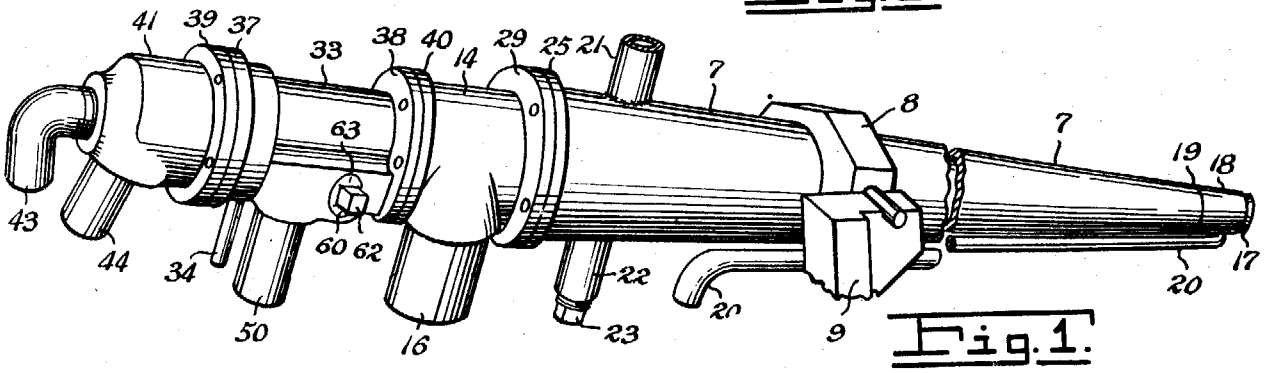
Fig. 1 is a perspective view of the improved burner, the support for which is fragmentally illustrated.

Referring to Figs. 1 and 2 of the drawings, the body of the burner is indicated at 7, and may consist of a long tube supported intermediate its ends by means of a yoke 8 resting upon the trunnion block 9. The burner body or tube 7 forms the outer wall of a water jacket 10 that extends throughout the length of the body. The inner wall of the water jacket is formed by a tube 12 which is preferably concentric with the tube 7, this inner tube 12 being properly referred to also as the gas tube since it conveys gas from the rear end of the burner to the open nose 13 thereof. The gas is fed to the open rear end of the gas tube 12 by way of a gas manifold 14 whose chamber 15 communicates with the gas tube and with a supply pipe 16 suitably connected to a source of supply.

At the forward end of the burner, the gas tube 12 is provided with a weld indicated at 17 which provides a sealed joint with the nose 18 of the burner, the nose being welded to the outer tube or body 7 at the location 19. A water intake pipe 20 is welded or otherwise securely fixed to the burner nose, and furnishes the means by which a coolant such as water, may be directed to the forward end of the water jacket, to prevent burning and rapid deterioration of the burner. Water fed to the forward end of the water jacket through the supply pipe 20 is exhausted at the discharge pipe 21 located near the rear end of the water jacket. A jacket blow-off, or clean-out tube, likewise located near the rear end of the water jacket, is indicated at 22. This tube 22 may normally be capped or plugged, as indicated at 23 upon Fig. 1.

From the foregoing it will readily be understood that a continuous flow of coolant through the water jacket will preserve and protect it against burning or deteriorating under the intense heat of the furnace interior. The water jacket, of course, is completely separated from the gas manifold and the interior of gas tube 12, in any suitable manner. As indicated upon Fig. 2, the rear end of the body tube 7 may be welded as at 24 to an annular flanged ring 25, which ring has a shoulder 26 bearing upon the outer surface of the gas tube 12 to support said tube, while by means of suitable packing 27 and a gland 28, a leak proof connection is effected to preclude leakage of water from the water jacket to the gas chamber defined by tube 12. The flanged ring 25 may be fixed to the flange 29 of the gas manifold 14 in any suitable manner as by means of bolts or screws, Fig. 1.

Centrally of the gas tube, there is supported a fuel tube 30 having a forward open end that terminates at the nose of the burner. The fuel tube is surrounded throughout the major portion of its length, by a steam jacket tube 31, these tubes 30 and 31 being spaced apart sufficiently to permit a flow of steam to exhaust at the nose of the burner as long as the burner is in operation. The steam jacket formed by the tube 31 provides simple and efficient means for continuously heating the fuel pipe and thereby conditioning the fuel for instant and complete combustion forwardly of the burner nose. Steam for the jacket is supplied from the chamber 32 of a steam head or manifold housing 33, which [is] *has an entry port 68* connected to a source of supply by means of a suitable pipe or tube 34. The rear end 35 of the fuel tube preferably is supported by the steam head, *in communication and alignment with the mixer outlet port 67*, preferably with the employment of a threaded connection indicated at 36. The steam head is provided with annular flanges 37 and 38 to be bolted or otherwise securely fixed relative to the flanges 39 and 40 of the atomizer housing 41 and the gas head 14. By removing the atomizer housing 41, access may be had to the fuel tube for cleaning or replacement when necessary.

It may be here stated that the atomizer housing is shown only in a conventional manner, but it consists essentially of an atomizing chamber 42 into which a liquid fuel such as oil is fed by means of a pipe 43, while a stream of atomizing gas such as steam under pressure enters the atomizer chamber by way of the tube 44.

The central fuel tube 30 will be seen to extend from the atomizer housing to the tip of the burner, and throughout the greater portion of this distance the fuel tube is kept in a heated state by the flow of steam under pressure passing from the chamber 32 forwardly through the jacket formed by the concentric tubes 30 and 31. These tubes may be kept in concentric spaced relationship in any suitable manner, as by means of the projections or pimples 45 formed upon the outer surface of the fuel tube. At the flanges 38 and 40 of the steam head and the gas head, the rear end of the steam tube 31 may be supported in a bushing 46 screw threaded into the open end of the steam chamber, as indicated at 47. It may be noted that bushing 46 affords a connection sufficiently tight to prevent the passage of steam from chamber 32 to the gas chamber indicated at 15. Thus, steam under pressure will be discharged from the tip of the burner independently of the stream of gas discharged from the space surrounding the steam tube 31. A spider or other supporting device 48 within the gas tube 12 may furnish the necessary support to maintain the steam tube and the fuel tube in axial relationship with the burner body.

The use of oxygen under pressure has proven highly effective in a burner of this type, to enhance the quality and heating performance of the flame resulting from the discharge of fuel oil, combustible gas, and steam at the tip of the burner. It has been discovered that the various combustible elements, in order to provide a most effective and serviceable flame, should mix at a point in advance of the burner tip, rather than within the structure of the burner. A high velocity of fuel discharge is preferred, and it is essential that the liquid fuel employed shall combine with the oxygen and the gas at an elevated temperature such as the steam jacket surrounding the fuel tube provides. The supply of oxygen for the flame will preferably be brought to the burner tip in the manner now to be explained.

At a location near the rear end of the burner body, oxygen under pressure may be supplied by means of a pipe 50, to the several oxygen tubes 51, 52, and 53 which extend along substantially the full length of the burner body. These oxygen tubes may find support in three separate interiorly threaded apertures of the steam head 33, one of which apertures is indicated at 54 upon Fig. 2. The tube 51 extends forwardly and has and end 55 terminating near the burner tip. The end of the oxygen tube may be exteriorly threaded as at 56, to accommodate an internally threaded oxygen tip 57 which is somewhat larger in diameter than the oxygen tube. By reason of its greater diameter, the oxygen tip, resting upon the forward end of the gas tube 12, so elevates the forward end of the oxygen tube as to direct its stream of oxygen toward the axis of the fuel tube, the point of convergency being located well in advance of the burner tip. By supplying oxygen tips 57 of varying diameters, the point of convergency may be established at greater or lessr distances from the tip of the burner.

Figure 4:
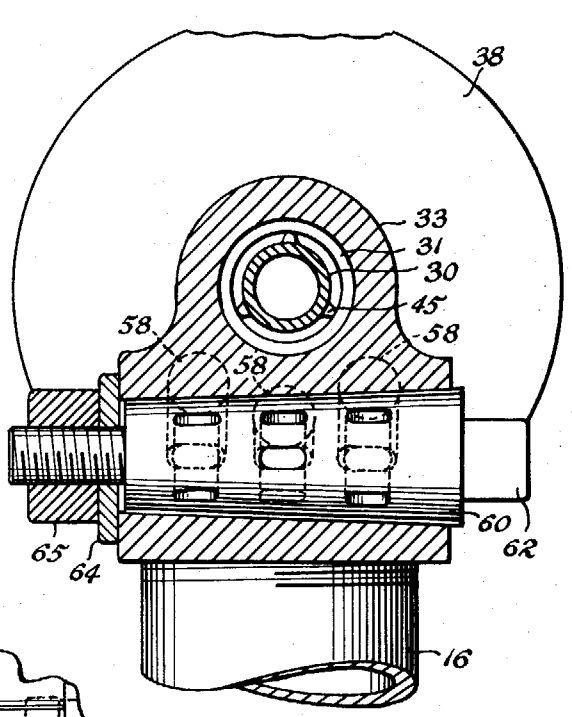
Fig. 4 is an enlarged cross-sectional view taken on line 4—4 of Fig. 2.
Figure 5:
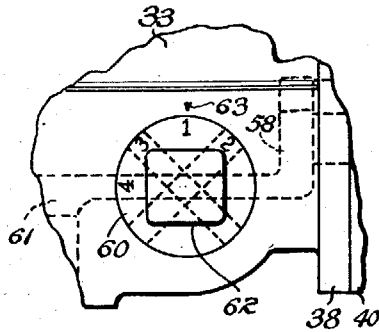
Fig. 5 is a fragmental side elevational view looking from right to left, at the valve illustrated by Fig. 4.
Figure 3:
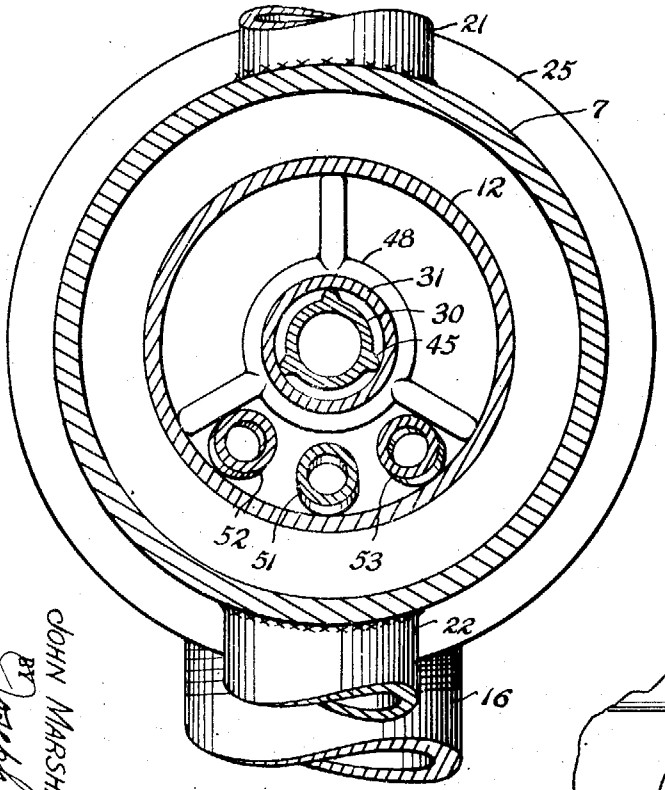
Fig. 3 is an enlarged cross-sectional view taken on line 3—3 of Fig. 2.

At the rear end, the oxygen tube 51 communicates with a socket 58 formed preferably within the body of the steam head or manifold housing 33. Similar sockets entirely separated from one another, are formed within the head to communicate with the remaining oxygen tubes 52, and 53, respectively. By means of a valve 60, oxygen from the manifold 61 fed by the supply pipe 50, may be fed selectively to the oxygen tubes, and in addition, the valve is provided with an arrangement of ports whereby oxygen may be directed into all of the oxygen tubes simultaneously. That is to say, by rotating the movable valve element 60 to selected positions, the operator may cause oxygen under pressure to enter selected ones of the tubes, or all of them simultaneously, for discharge of the oxygen stream at the tip of the burner. For this purpose, the valve may be provided with a head 62 to accommodate a wrench or lever, and if desired, the valve may be indexed with respect to a point 63 as suggested by Fig. 5 of the drawings. As the port arrangement of such a valve will readily be understood by those familiar with distribution of gases and liquids from a manifold, it is considered unnecessary to burden this description with a protracted explanation of the relative disposition and angular relationship of all the valve ports with respect to one another. It is material only that the valve shall so function as to distribute oxygen under pressure selectively to the several oxygen tubes 51—52—53, or to all of the tubes simultaneously, upon predetermined rotation or other manipulation of the control valve. As herein suggested, with particular reference to Fig. 4, the valve may be of the tapered plug type held upon its seat by means of a washer 64 and nut 65, in accordance with common practice.

It has been explained that the middle one of the oxygen tubes, indicated at 51, slopes upwardly toward the nose end of the burner, so that its axis will intersect the axis of the central fuel tube at a point well in advance of the burner tip. The remaining oxygen tubes 52 and 53 likewise slope upwardly, and inwardly also at their forward ends, so that all of them will direct their respective oxygen streams to approximately the same point of convergency with the axis of the fuel tube 30. It will accordingly be understood that the forward ends of the oxygen tubes are spaced apart a lesser distance than are the rear ends thereof. This disposition of the oxygen tubes, while perhaps not absolutely essential to a proper operation of the burner, is nevertheless preferable and results in a very desirable type of flame having a maximum heating function.

Each of the oxygen tubes is to be furnished with a tip such as is indicated at 57 of Fig. 2, and all of the tips are subject to replacement with tips of different diameters, so that the several streams of oxygen may be directionally altered to obtain the most effective flame adjustment for maximum performance.

While in the present disclosure a particular form of valve 60 is illustrated, and housed within the part referred to as the steam head or manifold housing 33, it is by no means essential that the valve shall be of the type illustrated upon the drawings. Neither is it essential that the particular part 33 shall support the valve, since obviously the valve may be located exteriorly of the burner apparatus, to control flow of oxygen to individual short pipes or tubes communicating with the rear ends of the several oxygen tubes. In some instances, where the type of installation permits, the oxygen control valve may be omitted entirely, with each of the oxygen tubes being fed equal amounts of oxygen from a common source of supply.

It is to be understood that various other modifications and changes in the structural details of the apparatus may be made, within the scope of the appended claims, without departing from the spirit of the invention. Instead of oxygen as a fuel supplement, one may utilize some other combustion supporting gas possessing the necessary qualities for the purposes herein recited.

What is claimed is:

1. In a burner of the class described, the combination of a burner body including a cooling jacket tubular in form and having an open passageway axially within it, a fuel tube extending longitudinally through said passageway, and having a fuel inlet end and an outlet end, fuel atomizing means at the inlet end of the fuel tube, a second tube surrounding the fuel tube in spaced relationship, to provide a heating fluid chamber extending substantially from end to end of the fuel tubes, said heating fluid chamber being open at the outlet end of the fuel tube for discharge of heating fluid in the direction of the fuel discharge, means for directing a heating fluid into said chamber, means to project a plurality of independent oxygen streams in the general direction of heating fluid and fuel discharge, and means for controlling said oxygen streams.

2. In a burner of the class described, the combination of a tubular elongated burner body having an apertured nose end and a rear end, an elongated inner tube extending from the nose to the rear end of the burner body to establish within the burner body a cooling jacket, a steam manifold housing on the rear end of the burner body, including an entry port for steam under pressure, a fuel mixer *near the rear of the body and* having a port [aligned with the axis of the burner body], a fuel tube [communicating] *aligned* with the fuel mixer port *and communicating therewith* and passing through the steam manifold housing and the cooling jacket tube, to terminate at the nose aperture of the burner, said fuel tube being smaller in diameter than the nose aperture and having its adjacent end open and in spaced *relation* [approximate concentricity] to the wall of said aperture, a steam tube larger in diameter than the fuel tube and surrounding the latter in spaced relation thereto, said steam tube extending from the burner nose to the steam manifold housing, for conveying steam from said housing about and along the length of the fuel tube and discharging same through [the space at] the nose aperture, means supporting the steam tube in spaced [approximate concentricity] *relation* with both the fuel tube and the inner tube of the cooling jacket, and oxygen feeding means projecting through the space between the steam tube and the cooling jacket, and terminating approximately at the nose aperture of the burner.

3. In a burner of the class described, the combination of a tubular elongated burner body having an apertured nose end and a rear end, an elongated inner tube extending from the nose to the rear end of the burner body to establish within the burner body a cooling jacket, a steam manifold housing on the rear end of the burner body, including an entry port for steam under pressure, a fuel mixer [having a port aligned with the axis of the burner body] *near the rear of the body and having a port,* a fuel tube [communicating] *aligned* with the fuel mixer port *and communicating therewith* and passing through the steam manifold housing and the cooling jacket tube, to terminate at the nose aperture of the burner, said fuel tube being smaller in diameter than the nose aperture and having its adjacent end open and in spaced *relation* [approximate concentricity] to the wall of said aperture, a steam tube larger in diameter than the fuel tube, and surrounding the latter in spaced relation thereto, said steam tube extending from the burner nose to the steam manifold housing, for conveying steam from said housing about and along the length of the fuel tube and discharging same through [the space at] the nose aperture along the axis of the burner body, a source of oxygen under pressure, tube means terminating at the nose end, said tube means being open at the nose end, the open end of said tube means being spaced from the fuel tube and being directed toward and at an acute angle to the fuel tube axis, and means for introducing oxygen from said source into said tube means to leave the tube means at the open end, whereby the oxygen is projected to intersect the fuel and steam discharge at a location remote from the burner nose.

4. In a burner of the class described, the combination of a tubular elongated body having an apertured nose end and a rear end, an elongated inner tube extending from the nose to the rear end of the burner body to establish within the burner body a cooling jacket, a steam manifold housing on the rear end of the burner body, including an entry port for steam under pressure, a fuel mixer [having a port aligned with the axis of the burner body] *near the rear of the body and having a port*, a fuel tube [communicating] *aligned* with the fuel mixer port *and communicating therewith* and passing through the steam manifold housing and the cooling jacket tube, to terminate at the nose aperture of the burner, said fuel tube being smaller in diameter than the nose aperture and having its adjacent end open and in spaced *relation* [approximate concentricity] to the wall of said aperture, a steam tube larger in diameter than the fuel tube, and surrounding the latter in spaced relation thereto, said steam tube extending from the burner nose to the steam manifold housing, for conveying steam from said housing about and along the length of the fuel tube and discharging same through [the space at] the nose aperture along the axis of the burner body, tube means located within said burner body having a discharge opening located in the nose of the burner and spaced from the fuel tube, and an inlet at the rear end of said burner body to which a source of supply of oxygen under pressure may be connected, the discharge end of said tube means being disposed at such an angle with respect to the line of discharge of fuel from the nose end of the fuel tube that the oxygen discharging from said tube means intersects the steam and fuel discharging from the burner at a location remote from the burner nose, and control means for said oxygen discharging tube means.

5. A burner in accordance with claim 1 characterized by the fact that the oxygen stream projecting means comprises a plurality of tubes disposed within the burner body and having their discharge ends supported in the outlet end of said burner body below and in spaced relation to the outlet of said fuel tube, the opposite ends of said oxygen carrying tubes being in the inlet end of said burner body and connected to said oxygen controlling means, said oxygen carrying tubes having their discharge ends inclined at an angle towards the axis of said fuel tube to cause the oxygen discharging therefrom to intersect the stream of fuel discharging from said fuel tube at a point forwardly of the discharge end of said fuel tube.

JOHN MARSHALL CROWE.

REFERENCES CITED

The following references are of record in the file of this patent or the original patent:

UNITED STATES PATENTS

| Number | Name | Date |
|---|---|---|
| 378,326 | Lewis | Feb. 21, 1888 |
| 541,310 | Broadwell | June 18, 1895 |
| 955,092 | McGahan | Apr. 12, 1910 |
| 1,588,634 | Wallstrom | June 15, 1926 |
| 1,841,698 | Barber | Jan. 19, 1932 |
| 1,852,946 | Topper | Apr. 5, 1932 |
| 2,303,648 | Lemster et al. | Dec. 1, 1942 |
| 2,338,623 | Crowe | Jan. 4, 1944 |
| 2,362,085 | Morgan | Nov. 7, 1944 |
| 2,385,153 | Morton | Sept. 18, 1945 |
| 2,412,579 | Hauzvic | Dec. 17, 1946 |